United States Patent [19]

Goe, Jr. et al.

[11] Patent Number: 5,181,158
[45] Date of Patent: Jan. 19, 1993

[54] PHASE BARIER FOR PADMOUNTED SWITCHGEAR

[75] Inventors: Melvin B. Goe, Jr.; Carl W. Yager, both of Centralia, Mo.

[73] Assignee: A. B. Chance, Centralia, Mo.

[21] Appl. No.: 805,023

[22] Filed: Dec. 11, 1991

[51] Int. Cl.⁵ .............................................. H02B 5/00
[52] U.S. Cl. .................................. 361/335; 200/304; 361/331
[58] Field of Search ................. 200/50 AA, 50 C, 304; 361/331, 335-339, 342-347, 376

[56] References Cited

U.S. PATENT DOCUMENTS 3,899,722  8/1975  Cadez et al. .
4,142,078  2/1979  Kalvaitis .
4,233,643  11/1980  Iverson et al. .
4,449,021  5/1984  Wakayama et al. .
4,689,716  8/1987  Cooper et al. .
4,791,530  12/1988  Kalvaitis et al. .
5,003,427  3/1991  Reichl et al. .

OTHER PUBLICATIONS

Transmission & Distribution, Jul. 1986 for Electrical Equipment, Inc.
Descriptive Bulletin 662-30, by S&C Manual PMH and PMS Pad-Mounted Gear Instructions for Installation of S&C Pad-Mounted Gear, Manual PMH and PMS Models.

Primary Examiner—Gregory D. Thompson
Attorney, Agent, or Firm—Hovey, Williams, Timmons & Collins

[57] ABSTRACT

In a multiple-phase electrical distribution apparatus, a number of barrier panels formed of dielectric material are provided for separating electrical transmission components disposed within the apparatus. The barrier panels may be manually placed in and lifted from a working position within the enclosure, and are supported in the working position by a mounting bracket extending horizontally in a direction parallel to the direction in which the components are spaced. The bracket includes a transverse slot disposed between the electrical transmission components and defining a pair of bearing surfaces which grip opposed surfaces of the barrier panel when the lower edge of the panel is inserted in the slot. Also, the barrier panel engages a slot formed in the enclosure above the bracket to stabilize the barrier panel against lateral movement. By this construction, the panels are self supporting and do not require the use of fastening expedients such as threaded fasteners or the like to secure the panels in the working position.

9 Claims, 2 Drawing Sheets

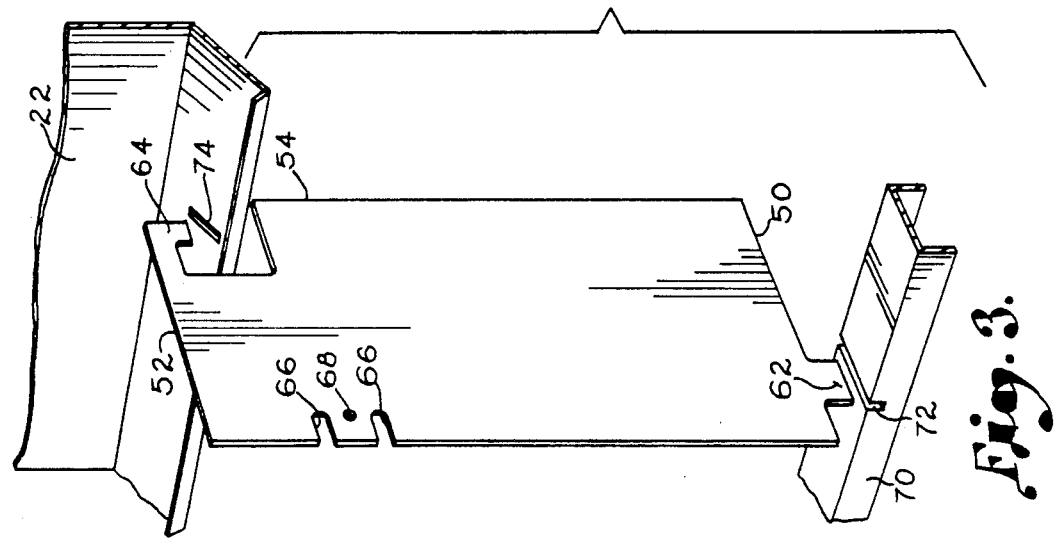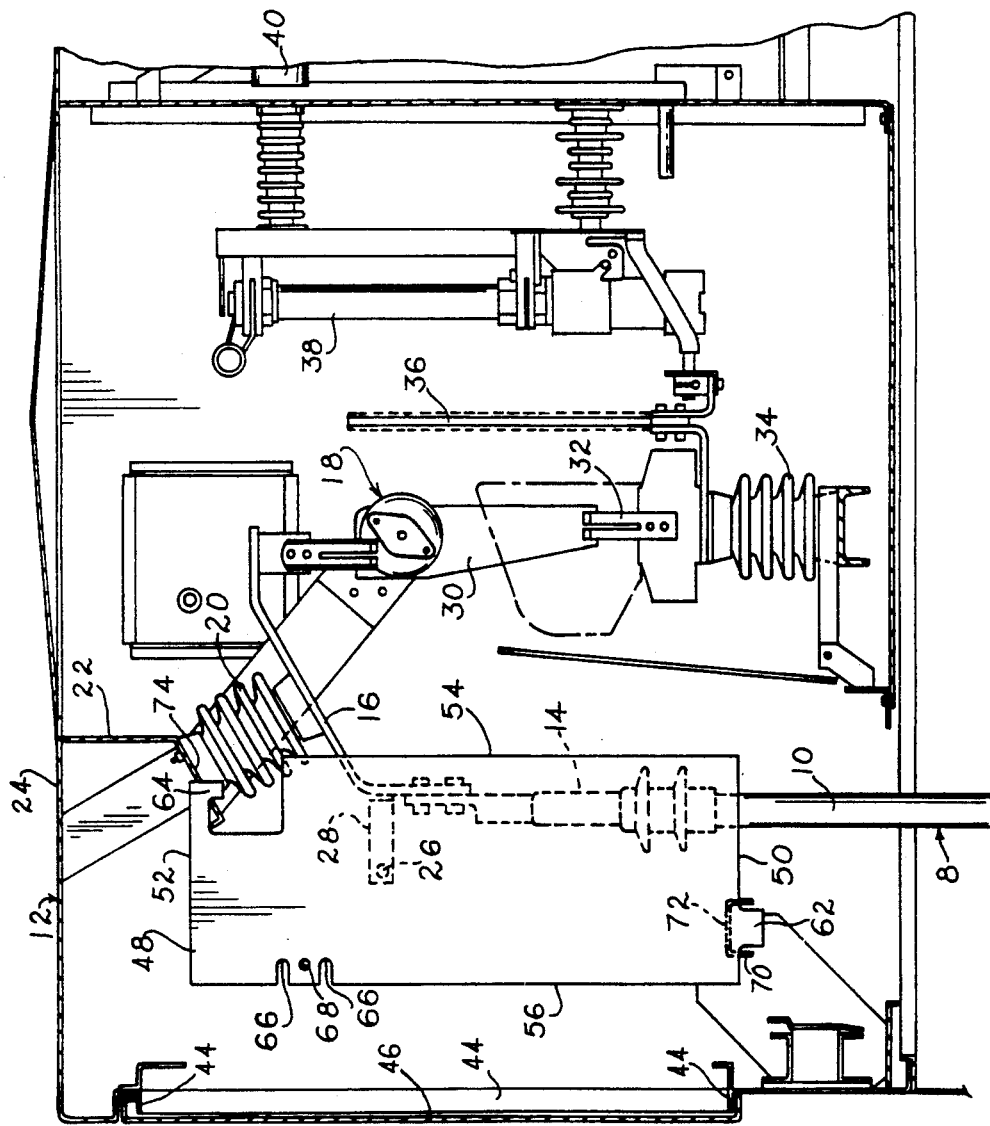

PHASE BARIER FOR PADMOUNTED SWITCHGEAR

BACKGROUND OF THE INVENTION

1. Field of the Invention

The present invention relates generally to multiple-phase electrical distribution devices and, more particularly, to a phase barrier for use in separating the phases of electricity within the apparatus from one another in order to prevent physical contact or electrical communication between the phases.

2. Discussion of the Prior Art

Padmounted switchgear is conventionally used in underground electrical distribution systems to permit ground level access to switching systems in order to permit visual inspection and maintenance of the switching systems and to permit the distribution system to be conveniently operated by a worker standing on the ground adjacent the padmounted switchgear.

One safety aspect associated with the use of such padmounted switchgear involves the need for separating the phases from one another within the enclosure of the switchgear in order to permit measurements to be made of the individual phases without the danger of contact being made with adjacent phases. Many utilities require the use of stick-mounted meters in carrying out measurements within padmounted switchgear and the ground adjacent such switchgear is frequently uneven, e.g. in situations where the area around the switchgear is under construction. These factors contribute to the potential danger to a lineman assigned the task of working on the switchgear.

According to U.S. Pat. No. 4,791,530, an insulating barrier system is provided for separating the phases within a multiple-phase switchgear device from one another. The barrier system includes a plurality of barriers, each including a customized shape adapted to fit within the enclosure of the device between a pair of separate phases. A support member is provided within the enclosure and includes a plurality of receiving slots for receiving the barriers, and a wing-head stud is provided on each of the barriers for securing the barriers to the frame of the enclosure once the barriers are positioned in the slots.

Another known barrier assembly is illustrated in U.S. Pat. No. 4,689,716, and includes a set of barriers assembled in a modular arrangement and movable together into and out of a working position in which the barriers separate all phases within a switchgear device.

Although known barrier arrangements help prevent physical contact between adjacent phases in electrical distribution systems, it would be advantageous to provide a barrier construction that is tool operable or positionable by hand, and that does not require manual manipulation of fastening expedients, such as threaded or snap fasteners and the like, in order to secure the barrier in position within the device. None of the conventional systems provide for the use of a barrier panel that is self-supporting within the switchgear device such that installation of the panel requires only a one-step placement, and removal consists merely of lifting the panel from the device.

OBJECTS AND SUMMARY OF THE INVENTION

It is an object of the present invention to provide a phase barrier that addresses the needs left unsolved by conventional barrier assemblies, and to provide a barrier construction which permits simple, one-step installation and removal, while reducing the complexity and expense of the phase barrier.

It is another object of the present invention to provide a phase barrier construction which may be used both between phases and between the enclosure of the switchgear device and adjacent phases, and which permits interchangability of the barrier panels such that panels may be easily replaced by panels removed from other positions within the switchgear device.

In accordance with these and other objects evident from the following description, a multiple-phase electrical distribution apparatus including an enclosure and at least two electrical transmission components is provided with a barrier panel formed of a dielectric material and support means for permitting the barrier panel to be manually placed in a working position within the enclosure and to be manually lifted from the working position, and for supporting the barrier panel when in the working position. The support means includes a mounting bracket extending horizontally in a direction parallel to the direction in which the components are spaced. The bracket is provided with a transverse slot disposed between the electrical transmission components and defining a pair of bearing surfaces which grip the opposed surfaces of the barrier panel when the lower edge of the panel is inserted in the slot. The support means also includes means for preventing the barrier panel from sliding within the slot in a direction transverse to the direction in which the mounting bracket extends, and structure defining a recess in the enclosure located above the transverse slot in the mounting bracket. The barrier panel engages the recess to stabilize the barrier panel against lateral movement while the barrier panel is supported within the slot of the mounting bracket.

By this construction, numerous advantageous results are achieved. For example, by providing a construction including a recess in the enclosure which is engaged by the barrier panel, the panel is self-supporting, and may be manually placed in or lifted from a working position without the need for additional fasteners.

BRIEF DESCRIPTION OF THE DRAWING FIGURES

A preferred embodiment of the present invention is described in detail below with reference to the attached drawing figures, wherein:

FIG. 2 is a sectional view of the apparatus taken along line 2—2 of FIG. 1; and

FIG. 3 is a perspective view illustrating a single barrier panel and the cooperating elements of the distribution apparatus.

DETAILED DESCRIPTION OF THE PREFERRED EMBODIMENT

Figure 1:
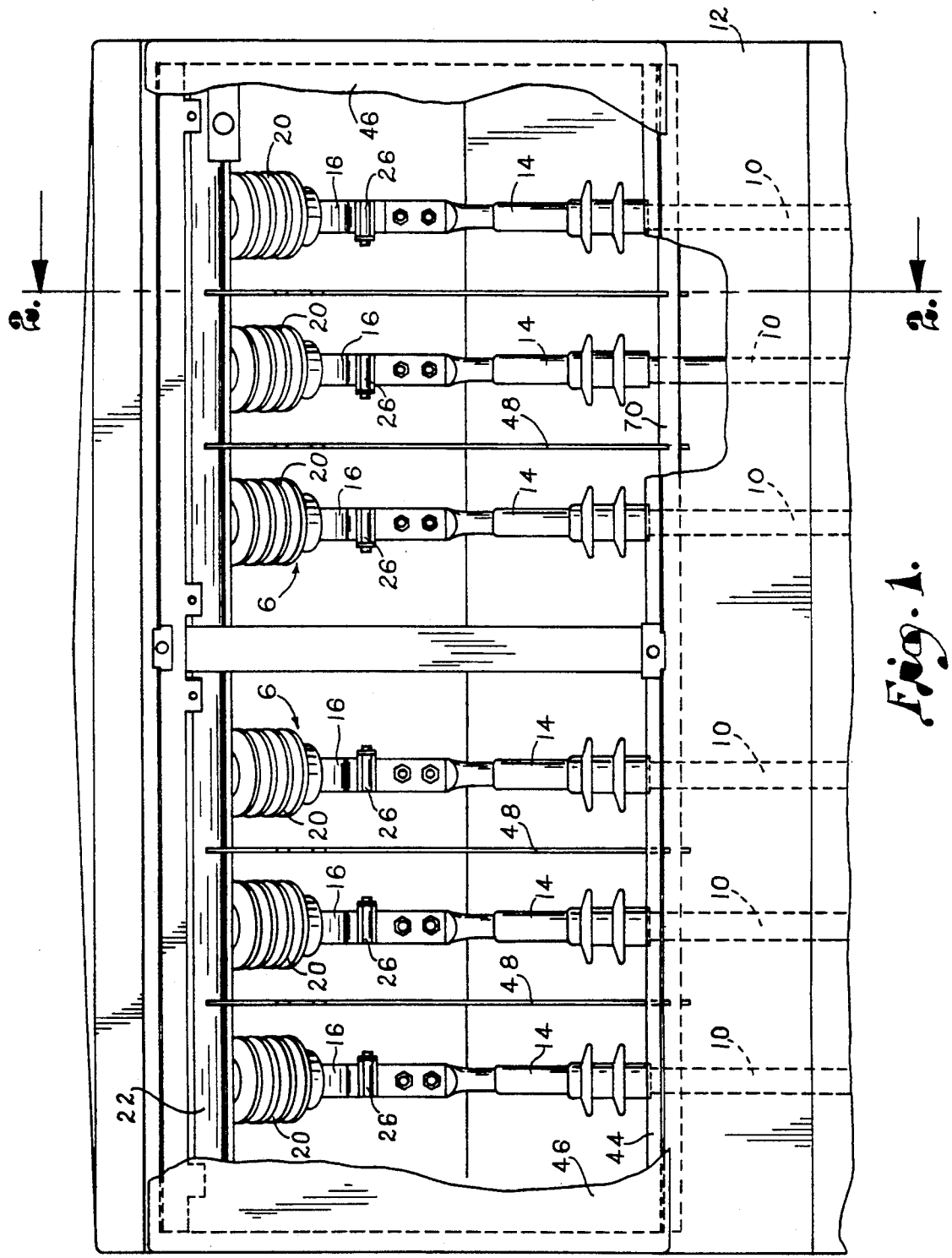
FIG. 1 is a front elevational view, partially cut away, of a multiple-phase electrical distribution apparatus constructed in accordance with a preferred embodiment of the present invention.

A padmounted switchgear apparatus constructed in accordance with a preferred embodiment of the invention is illustrated in FIG. 1. The padmounted switchgear can, e.g. be a 15 kV or 25 kV, Model 608 Air-Insulated Switch, marketed by A. B. Chance Company, which includes a live-front source side and a dead-front fuse side.

As shown in FIG. 1, the switchgear apparatus includes two side-by-side, three-phase switchgear assemblies 6 so as to permit the apparatus to be used in a loop-type distribution system. Each of the phases within the assemblies are spaced laterally from adjacent phases within the apparatus, and the assemblies are spaced laterally from one another in order to separate the assemblies physically and electrically from one another. It is noted that although the preferred embodiment includes such switchgear assemblies, the phase barriers of the present invention may be employed in any conventional multiple-phase electrical distribution system including at least two electrical transmission components for controlling separate phases of electricity within the apparatus, or in single-phase applications to provide a barrier between the phase and the enclosure wall.

Turning to FIG. 2, a single-phase line 8 of one of the switchgear assemblies 6 is illustrated. A primary power line 10 protrudes vertically into an enclosure 12 of the apparatus through an opening on the lower side of the enclosure. The power line 10 is connected to a live-front terminator 14 that is secured to a conductor 16 extending between the terminator and a switchgear device 18. The conductor 16 is supported within the enclosure by an insulator 20 secured to an upper source side panel 22 extending downward from an upper panel 24 of the enclosure, and a rod 26, to which a grounding device may be attached, is secured to the conductor by a bracket 28.

A movable contact 30 of the switchgear device is electrically connected to the conductor 16 and includes a blade that is pivotable about a shaft between a closed position, as shown in FIG. 2, and an open position. When in the closed position, the blade is in engagement with a fixed contact 32 of the switchgear device such that current flows through the device. When in the open position the blade is pivoted out of engagement with the fixed contact.

The fixed contact 32 of the switchgear device 18 is supported on an insulator 34 secured to the enclosure and is connected through a U-shaped bus conductor 36 to one contact of a fuse 38. The fuse includes a second contact opposite the first contact which is connected to a fuse-side terminator 40. This terminator is preferably a dead-front terminator which is, in turn, connected to a tap power line, not shown.

An access opening 44 is provided on the source side of the enclosure adjacent the primary power lines and an panel 46 is fitted on the access opening in order to normally prevent access to the interior of the enclosure. The panel may be opened by a lineman to permit measurements to be made or maintenance to be carried out.

A barrier panel 48 is supported within the enclosure adjacent the access opening 44 between the power line 10, terminator 14 and conductor 16 of one of the phases and the power line, terminator and conductor of an adjacent phase. The purpose of the barrier panel 48 is to prevent a connection from being made between a pair of adjacent phases during measurement or maintenance operations being carried out on one of the phases. For example, if a lineman is taking a measurement by connecting a meter to the rod 26 of one of the phases, the barrier panels supported on either side of that phase prevent the meter or other hardware from inadvertently coming into contact with the conductor or terminator of an adjacent phase. Also, the barrier panel increases dielectric between adjacent phases and/or phase to enclosure.

Each barrier panel 48 is formed of an insulative material which does not easily absorb moisture. Preferably, a dielectric material such as polyester glass laminate is used. As shown in FIG. 3, each panel is formed of a body having a lower edge 50, an upper edge 52 opposed to the lower edge, a front edge 54, a rear edge 56, and opposed side surfaces. A tab 62 protrudes from the lower edge of the body adjacent the rear edge 56, while a hook 64 is formed in the front edge 54 of the body adjacent the upper edge. By this construction, the tab 62 and hook 64 are disposed diagonally across the body from one another.

The body also includes a pair of spaced slots 66 cut into the rear edge and a circular hole 68 positioned intermediate the slots. The slots 66 and hole 68 are arranged to mate with an insulated grip-all stick, sometimes called a shotgun stick, of the type conventionally used by lineman for manipulating components of an electrical distribution system. By providing the slots and hole in each barrier panel, it is possible to install or remove the panel with a grip-all stick without the need for additional equipment.

Support means are provided for permitting each barrier panel 48 to be manually placed in a working position within the enclosure and to be manually lifted from the working position, and for supporting the barrier panel when in the working position. The support means includes a mounting bracket 70 extending horizontally in a direction parallel to the direction in which the phases or components are spaced.

The bracket includes a plurality of transverse slots 72 disposed between each pair of switchgear devices and between the side walls of the enclosure and the switchgear devices located adjacent the side walls. The bracket 70 is an inverted U-shaped channel having an upper wall and two vertical side walls. Each of the slots extends completely through the upper wall and into the side walls so that each slot defines a pair of bearing surfaces adapted to grip the opposed surfaces of the barrier panel 48 when the lower edge 50 of the panel is inserted in the slot 72.

The support means also includes means for preventing the barrier panels from sliding within the slots in a direction transverse to the direction in which the mounting bracket extends. This means includes the tab 62 provided on each barrier panel 48, the tab extending into the central recess defined by the U-shaped channel when each barrier panel is inserted into the slot such that the tab engages the side walls of the channel and prevents the panel from sliding more than a very slight distance either toward or away from the access opening 44 of the enclosure.

The upper source side panel 22 is angled toward the access opening of the enclosure and includes a plurality of recesses 74, each aligned with one of the slots 72 in the bracket 70. Each recess 74 is preferably comprised of a slot extending through the panel 22 and sized to receive the hook 64 of one of the barrier panels 48. The hook on one of the barrier panels engages each recess after the tab 62 and lower edge 50 of the panel are inserted into the slot 72, and stabilizes the barrier panel against lateral movement while the barrier panel is supported within the slot of the mounting bracket.

In order to install one of the panels 48, the panel is either gripped with rubber gloves or by a grip-all stick and positioned in the enclosure with the tab 62 aligned with the slot 72 in the mounting bracket 70 and with the hook 64 aligned with the recess 74 in the upper source side panel 22. Thereafter, the panel is lowered so that the tab 62 is received in the slot 72. The tab 62 guides the lower edge 50 into the slot 72 and directs the hook 64 toward the recess 74 so that the panel drops into the assembled position without excessive manipulation of the panel. If removal of the panel is desired, these steps are simply reversed.

Although the invention has been described with reference to the preferred embodiment illustrated in the attached drawing figures, it is understood that substitutions may be made and equivalents employed herein without departing from the scope of the invention as recited in the claims.

What is claimed is:

1. A multiple-phase electrical distribution apparatus comprising:
   an enclosure having an access opening and defining an interior space;
   at least two electrical transmission components for controlling separate phases of electricity within the apparatus, the components being disposed within the enclosure and being spaced laterally from one another;
   a barrier panel formed of a dielectric material and sized to provide a barrier between the components when positioned within the enclosure, the barrier panel including opposed surfaces, a lower edge, and an upper edge opposite the lower edge; and
   support means within the enclosure for permitting the barrier panel to be manually placed in a working position within the enclosure and to be manually lifted from the working position, and for supporting the barrier panel when in the working position, the support means including
      a mounting bracket connected to the enclosure and extending horizontally in a direction parallel to the direction in which the components are spaced, the bracket including a transverse slot disposed between the electrical transmission components and defining a pair of bearing surfaces which grip the opposed surfaces of the barrier panel when the lower edge of the panel is inserted in the slot,
      means on the barrier panel for preventing the barrier panel from sliding within the slot in a direction transverse to the direction in which the mounting bracket extends, and
      structure defining a recess in the enclosure located above the transverse slot in the mounting bracket, the barrier panel engaging the recess to stabilize the barrier panel against lateral movement while the barrier panel is supported within the slot of the mounting bracket.

2. The apparatus as recited in claim 1, wherein the barrier panel is formed of a polyester glass laminate material.

3. The apparatus as recited in claim 1, wherein the bracket includes an additional transverse slot disposed between one of the electrical transmission components and the enclosure, and the structure includes an additional recess in the enclosure located above the additional transverse slot, the apparatus further comprising an additional barrier panel and means for permitting the barrier panel to be manually placed in a working position within the enclosure and to be manually lifted from the working position, and for supporting the barrier panel when in the working position.

4. The apparatus as recited in claim 1, wherein the barrier panel includes means for permitting gripping of the barrier panel by an insulated tool.

5. A multiple-phase electrical distribution apparatus comprising:
   an enclosure having an access opening and defining an interior space;
   at least two electrical transmission components for controlling separate phases of electricity within the apparatus, the components being disposed within the enclosure and being spaced laterally from one another;
   a barrier panel formed of a dielectric material and sized to provide a barrier between the components when positioned within the enclosure, the barrier panel including opposed surfaces, a lower edge, and an upper edge opposite the lower edge; and
   support means within the enclosure for permitting the barrier panel to be manually placed in a working position within the enclosure and to be manually lifted from the working position, and for supporting the barrier panel when in the working position, the support means including
      a mounting bracket connected to the enclosure and extending horizontally in a direction parallel to the direction in which the components are spaced, the bracket including a transverse slot disposed between the electrical transmission components and defining a pair of bearing surfaces which grip the opposed surfaces of the barrier panel when the lower edge of the panel is inserted in the slot,
      means on the barrier panel for preventing the barrier panel rom sliding within the slot in a direction transverse to the direction in which the mounting bracket extends, a tab formed in the panel and extending from the lower edge, the transverse slot including a recess sized to receive the tab when the lower edge of the panel is positioned in the slot; and
      structure defining a recess in the enclosure located above the transverse slot in the mounting bracket, the barrier panel engaging the recess to stabilize the barrier panel against lateral movement while the barrier panel is supported within the slot of the mounting bracket.

6. The apparatus as recited in claim 1, wherein three electrical transmission components are provided and define a three-phase distribution apparatus, a barrier panel and support means being provided between each of the components.

7. A multiple-phase electrical distribution apparatus comprising:
   an enclosure having an access opening and defining an interior space;
   at least two electrical transmission components for controlling separate phases of electricity within the apparatus, the components being disposed within the enclosure and being spaced laterally from one another;
   a barrier panel formed of a dielectric material and sized to provide a barrier between the components when positioned within the enclosure, the barrier panel including opposed surfaces, a lower edge, and an upper edge opposite the lower edge; and support means within the enclosure for permitting the barrier panel to be manually placed in a working position within the enclosure and to be manually lifted from the working position, and for supporting the barrier panel when in the working position, the support means including a mounting bracket connected to the enclosure and extending horizontally in a direction parallel to the direction in which the components are spaced, the bracket including a transverse slot disposed between the electrical transmission components and defining a pair of bearing surfaces which grip the opposed surfaces of the barrier panel when the lower edge of the panel is inserted in the slot, means on the barrier panel for preventing the barrier panel from sliding within the slot in a direction transverse to the direction in which the mounting bracket extends, and structure defining a recess in the enclosure located above the transverse slot in the mounting bracket, the barrier panel engaging the recess to stabilize the barrier panel against lateral movement while the barrier panel is supported within the slot of the mounting bracket, the barrier panel including a hook sized for receipt in the recess.

8. In a multiple-phase electrical distribution apparatus including an enclosure, at least two electrical transmission components for controlling separate phases of electricity within the apparatus and being spaced laterally from one another, a mounting bracket connected to the enclosure and extending horizontally in a direction parallel to the direction in which the components are spaced and including a transverse slot defining a pair of bearing surfaces, and structure defining a recess in the enclosure located above the mounting bracket, a barrier panel comprising:

a body formed of a dielectric material and sized to provide a barrier between the components when positioned within the enclosure, the body including opposed surfaces, a lower edge, and an upper edge opposite the lower edge; and support means for permitting the barrier panel to be manually placed in a working position within the enclosure and to be manually lifted from the working position, and for supporting the barrier panel when in the working position, the support means including a tab extending from the lower edge of the body and adapted to mate with the transverse slot in the bracket to prevent the barrier panel from sliding within the slot in a direction transverse to the direction in which the mounting bracket extends, the bearing surfaces of the mounting bracket gripping the opposed surfaces of the body when the tab and lower edge of the panel are inserted in the slot, and engagement means for engaging the recess to stabilize the barrier panel against lateral movement while the barrier panel is supported within the slot of the mounting bracket.

9. An electrical distribution apparatus comprising:

an enclosure having an access opening and defining an interior space;

at least one electrical transmission component for controlling at least one phase of electricity within the apparatus, the component being disposed within the enclosure and being spaced laterally from the enclosure;

a barrier panel formed of a dielectric material and sized to provide a barrier between the component and the enclosure when positioned within the enclosure, the barrier panel including opposed surfaces, a lower edge, and an upper edge opposite the lower edge; and support means for permitting the barrier panel to be manually placed in a working position within the enclosure and to be manually lifted from the working position, and for supporting the barrier panel when in the working position, the support means including a mounting bracket connected to the enclosure and extending horizontally in a direction parallel to the direction in which the component is spaced from the enclosure, the bracket including a transverse slot disposed between the electrical transmission component and the enclosure and defining a pair of bearing surfaces which grip the opposed surfaces of the barrier panel when the lower edge of the panel is inserted in the slot, means for preventing the barrier panel from sliding within the slot in a direction transverse to the direction in which the mounting bracket extends, and structure defining a recess in the enclosure located above the transverse slot in the mounting bracket, the barrier panel engaging the recess to stabilize the barrier panel against lateral movement while the barrier panel is supported within the slot of the mounting bracket.

* * * * *